(12) United States Patent
Schoch

(10) Patent No.: US 6,658,999 B1
(45) Date of Patent: Dec. 9, 2003

(54) LINEAR INFLATABLE PRESS GUIDE SEAL

(75) Inventor: Daniel A. Schoch, Minster, OH (US)

(73) Assignee: The Minster Machine Company, Minster, OH (US)

( * ) Notice: Subject to any disclaimer, the term of this patent is extended or adjusted under 35 U.S.C. 154(b) by 211 days.

(21) Appl. No.: 09/677,632

(22) Filed: Oct. 3, 2000

Related U.S. Application Data

(60) Provisional application No. 60/159,717, filed on Oct. 15, 1999.

(51) Int. Cl.[7] .............................. B30B 1/42; B30B 1/32; F16C 33/02
(52) U.S. Cl. ..................... 100/214; 100/269.21; 384/39
(58) Field of Search ........................... 100/214, 269.21, 100/48, 299; 72/456; 384/39, 40, 13, 15

(56) References Cited

U.S. PATENT DOCUMENTS

| | | | |
|---|---|---|---|
| 2,606,046 A | | 8/1952 | Bonner et al. |
| 2,869,174 A | | 1/1959 | Hartesveldt |
| 3,642,291 A | | 2/1972 | Zeffer et al. |
| 3,689,082 A | | 9/1972 | Satterthwaite et al. |
| 3,710,401 A | | 1/1973 | Goettl |
| 4,095,522 A | * | 6/1978 | Drungil ...................... 100/214 |
| 4,200,341 A | | 4/1980 | Kauschke |
| 4,342,336 A | * | 8/1982 | Satterthwaite et al. ........ 138/90 |
| 4,375,785 A | * | 3/1983 | Schoch et al. ............... 100/214 |
| 4,475,278 A | * | 10/1984 | Schockman et al. .......... 29/434 |
| 4,489,924 A | * | 12/1984 | McDougal .................... 269/23 |
| 4,632,722 A | | 12/1986 | Pankoke |
| 5,482,623 A | * | 1/1996 | Pierson ....................... 210/236 |
| 5,775,212 A | * | 7/1998 | Takao ......................... 100/214 |
| 5,909,705 A | * | 6/1999 | Short et al. ................. 100/214 |

* cited by examiner

Primary Examiner—Allen Ostrager
Assistant Examiner—Jimmy Nguyen
(74) Attorney, Agent, or Firm—Randall J. Knuth

(57) ABSTRACT

An apparatus which forms a controlled engageable low maintenance seal between the slide and the gib of a mechanical press and which prevents lubricant from exiting the area between the slide and the gib and entering the die space. The sealing arrangement is selectively actuatable depending upon an operational condition of the press.

27 Claims, 3 Drawing Sheets

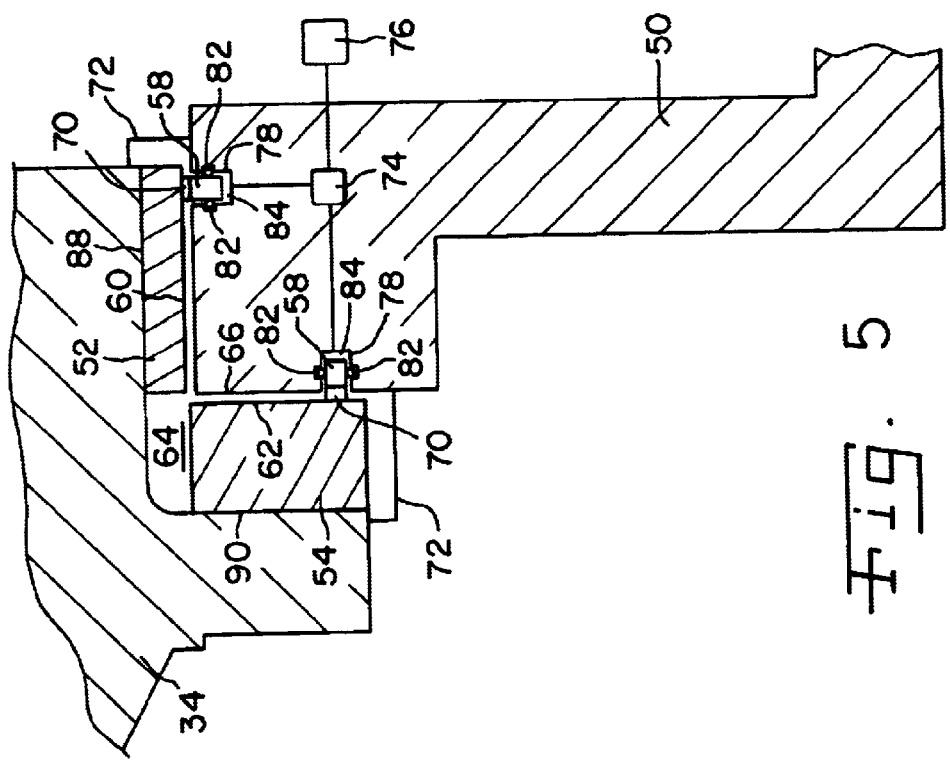
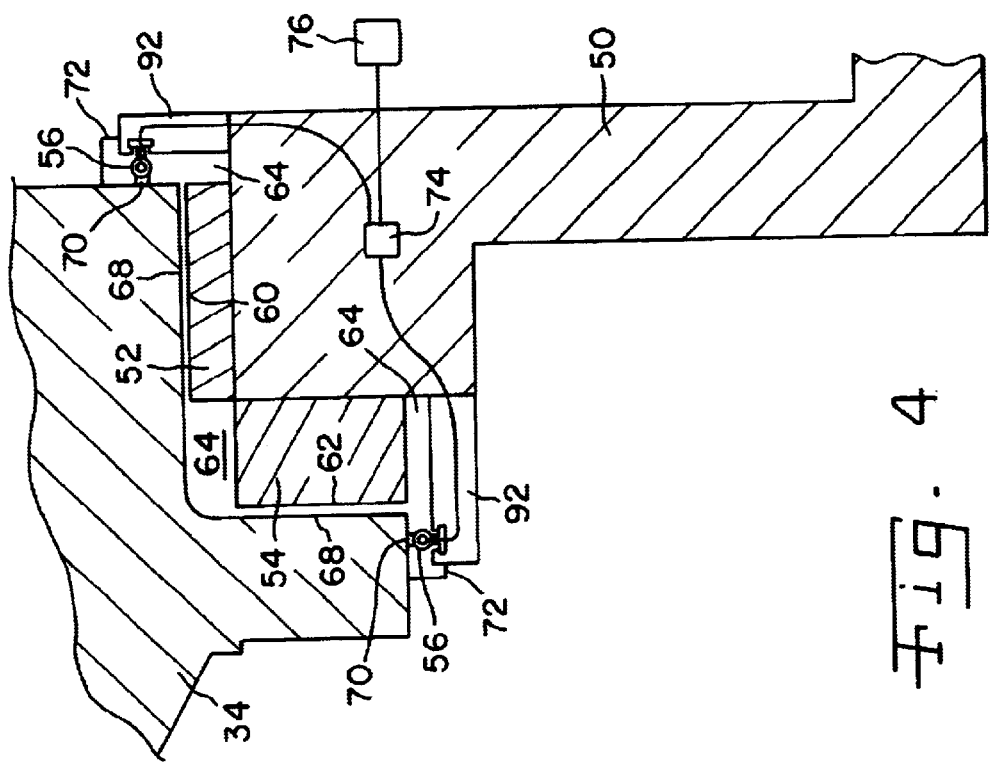

LINEAR INFLATABLE PRESS GUIDE SEAL

CROSS-REFERENCE TO RELATED APPLICATIONS

This application relates to and claims the benefit under 35 U.S.C. § 119 of Provisional Application Serial No. 60/159,717 filed Oct. 15, 1999 by the same inventor.

BACKGROUND OF THE INVENTION

1. Field of the Invention

The present invention relates to seals for use in a mechanical press and more particularly to seals which are selectively engageable and have low maintenance requirements. Specifically, this invention relates to the use of selectively engageable seals to control lubricant leakage in a mechanical press.

2. Description of the Related Art

Mechanical presses of the type performing stamping and drawing operations employ a conventional construction that includes a frame structure having a crown and a bed and which supports a slide in a manner enabling reciprocating movement toward and away from the bed. Conventional presses additionally include a gib. A gib is a mechanism in stamping or drawing presses which works to contain the lateral motion of a reciprocating slide in a direction substantially normal to the direction of the slide's reciprocating movement.

Press machines are widely used for a variety of workpiece operations and employ a large selection of die sets, with the press machine varying considerably in size and available tonnage depending on its intended use.

State of the art mechanical presses provide lubrication between the gib and the slide to facilitate and contain slide movement. The lubrication contained between the slide and the gib has a tendency to be pushed out and may leak onto the bed of a press. Factors such as press speed, tipping moment, applied load, and wear contribute to the likelihood of lubrication leaks.

Lubrication from portions of a mechanical press contained in the crown (among other places) may leak into the area between the slide and the gib. Additional lubricant entering the area between the gib and the slide exacerbates the problem of lubrication exiting the area between the gib and the slide and possibly finding its way onto the bed of the mechanical press. Leaking lubricant from other portions of a mechanical press (e.g. the crown) may also leak into other portions of the press (e.g. the bed) and cause problems.

Leaking lubricant may pass from the gib, down the slide and onto the parts being stamped on the press. In some production environments, oil leaks will cause scrapping of stamped product which leads to increased cost and production time.

Different sealing arrangements have been utilized in an effort to prevent lubricant from contacting stock material in a mechanical press. Current state of the art seals include seals which have flexible wiper portions which experience mechanical wear. This mechanical wear causes these seals to fail and leak. Frequent removal and replacement of these seals necessitate that the press be off-line and disassembled to obtain service access to the gib assembly.

What is needed in the art is a seal mechanism for sealing the area between the gib and the slide of a mechanical press in which the seal mechanism is adjustable controlled, and does not require frequent maintenance.

What is additionally needed in the art is a seal mechanism for a mechanical press which is selectively actuatable depending upon the operating condition of the mechanical press.

SUMMARY OF THE INVENTION

The present invention is directed to improve upon the aforementioned mechanical press sealing mechanisms, wherein it is desired to prevent lubricant from contacting stock material without experiencing frequent down time for seal replacement. The present invention also improves upon the current state of the art sealing mechanisms for a mechanical press by providing a selectively actuatable sealing arrangement which is responsive to press operational condition.

The present invention provides a seal mechanism for a mechanical press which includes seal surfaces which can be selectively engaged and are made from a highly wear resistant, low friction material.

The invention, in one form thereof, comprises a press which includes a sealing mechanism. The press includes a bed which is connected to a pair of uprights. The uprights are further connected to a crown. In this form of the current invention, the press includes a gib attached to the press and a selectively inflatable seal. The selectively inflatable seal is connected to the press and can be disposed between the slide and the uprights, the slide and the crown, or the slide and the gib.

The invention, in another form thereof, comprises a press which includes a selectively inflatable seal. In this form, an inflator selectively inflates the linear seal. A controller, which selectively actuates the inflator may be employed. The controller receives values corresponding to press operational condition and signals the inflator to inflate the linear seals when one of the values exceeds a predetermined measure. The values received by the controller include, for example, a measure of press tipping moment, a measure of applied load, a measure of press speed and/or a measure of sensed oil leaks.

The invention, in another form thereof, comprises a press including a press frame. A slide is mounted within the frame for reciprocation relative to the frame. A gib is connected to the frame and a plurality of linear seals are located between the gib and the slide and selectively form a cavity therebetween. In one form of the current invention, the linear seals are lengthwise substantially parallel to the direction in which the slide reciprocates.

The invention, in another form thereof, includes a plurality of wear plates which have wear plate contact surfaces and which maintain a position between the slide and the gib. The wear plates are connected either to the slide or the gib and are configured such that the wear plate contact surfaces are opposite and substantially parallel to gib contact surfaces or slide contact surfaces, respectively. A plurality of linear seals selectively form a cavity with the gib and the slide. The plurality of wear plates are located within the cavity. In one form of the current invention, the wear plates have a surface finish that is approximately within the range of 16 to 32 microfinish.

The invention, in another form thereof, includes a plurality of linear strips of wear material which are affixed to a plurality of linear seals such that when the linear seals are actuated, the linear strips of wear material contact the slide and form the seal contact surface. The strips of wear material are formed from a highly wear resistant, low friction material which can be, for example, TEFLON or TURCITE.

The invention, in another form thereof, comprises a press which includes a press frame. A slide is mounted within the frame for reciprocation relative to the frame and a gib is connected to the frame. A plurality of linear seals selectively form a cavity with the gib and the slide. A collection means, for example, a collection tray, collects lubricant from the cavity.

The invention, in another form thereof, comprises a press including a plurality of inflatable linear seals which selectively form a cavity with the slide and the gib of the press. In this form, an inflator selectively inflates the linear seals. A controller, which selectively actuates the inflator may be employed. In one form of the current invention, the controller receives values corresponding to press operational conditions and signals the inflator to inflate the linear seals when one of the values exceeds a predetermined measure. The values received by the controller include, for example, a measure of press tipping moment, a measure of applied load, a measure of press speed and/or a measure of sensed oil leaks.

The invention, in another form thereof, comprises a press which includes a press frame. A slide is mounted within the press frame for reciprocation relative thereto. A gib is connected to the frame and includes a plurality of linear grooves. A plurality of linear seals occupy the grooves in the gib and selectively form a cavity with the gib and the slide. The plurality of linear seals comprise a plurality of linear strips of steel which have sealing surfaces. A plurality of linear strips of wear material are affixed to the sealing surfaces of the plurality of linear strips of steel. In this form, the linear grooves include pressure chambers which selectively apply a pressure to the linear seals causing the linear seals to form a cavity with the gib and the slide.

The invention, in another form thereof, comprises a press which includes a press frame. A slide is mounted within the press frame for reciprocation relative thereto. A gib is connected to the frame and a linear seal surrounds the slide and selectively forms a seal between the slide and the gib.

The invention, in another form thereof, comprises a press. The press includes a frame and a slide mounted within the frame for reciprocation relative thereto. The slide has four corners each of which has a front-to-rear and a left-to-right touch surface. A plurality of wear plates having wear plate contact surfaces are affixed to each of the touch surfaces of the slide. In this form, the invention includes a plurality of seal contact blocks which correspond in number to the wear plates. One of said plurality of seal contact blocks extends outwardly from each wear plate. A gib is affixed to the frame and has a plurality of gib contact surfaces corresponding in number to the wear plates. The gib contact surfaces are opposite and substantially parallel to the wear plate contact surfaces. A plurality of inflatable linear seals are connected to the gib. One of the plurality of linear seals selectively contacts each of the contact blocks. In this way, the linear inflatable seals form four sealed cavities one at each of the four corners of the slide. Each of the sealed cavities vertically encloses the front-to-rear and the left-to-right touch surface at each corner of the slide. A linear strip of wear material is affixed to each of the linear seals such that it forms the surface of the linear seal which contacts the slide. A collection tray is configured for collecting lubricant from each of the sealed cavities.

An advantage of the present invention is the ability to prevent lubricant from contacting stock material without utilizing a sealing arrangement which requires frequent maintenance.

Another advantage of the present invention is that the seals of the present invention may be selectively engaged depending upon the operational condition of the mechanical press.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 4 is a top sectional view of the slide and the gib of a mechanical press including an embodiment of the sealing arrangement of the current invention; and FIG. 5 is a top sectional view of the slide and the gib of a mechanical press including an embodiment of the sealing arrangement of the current invention.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
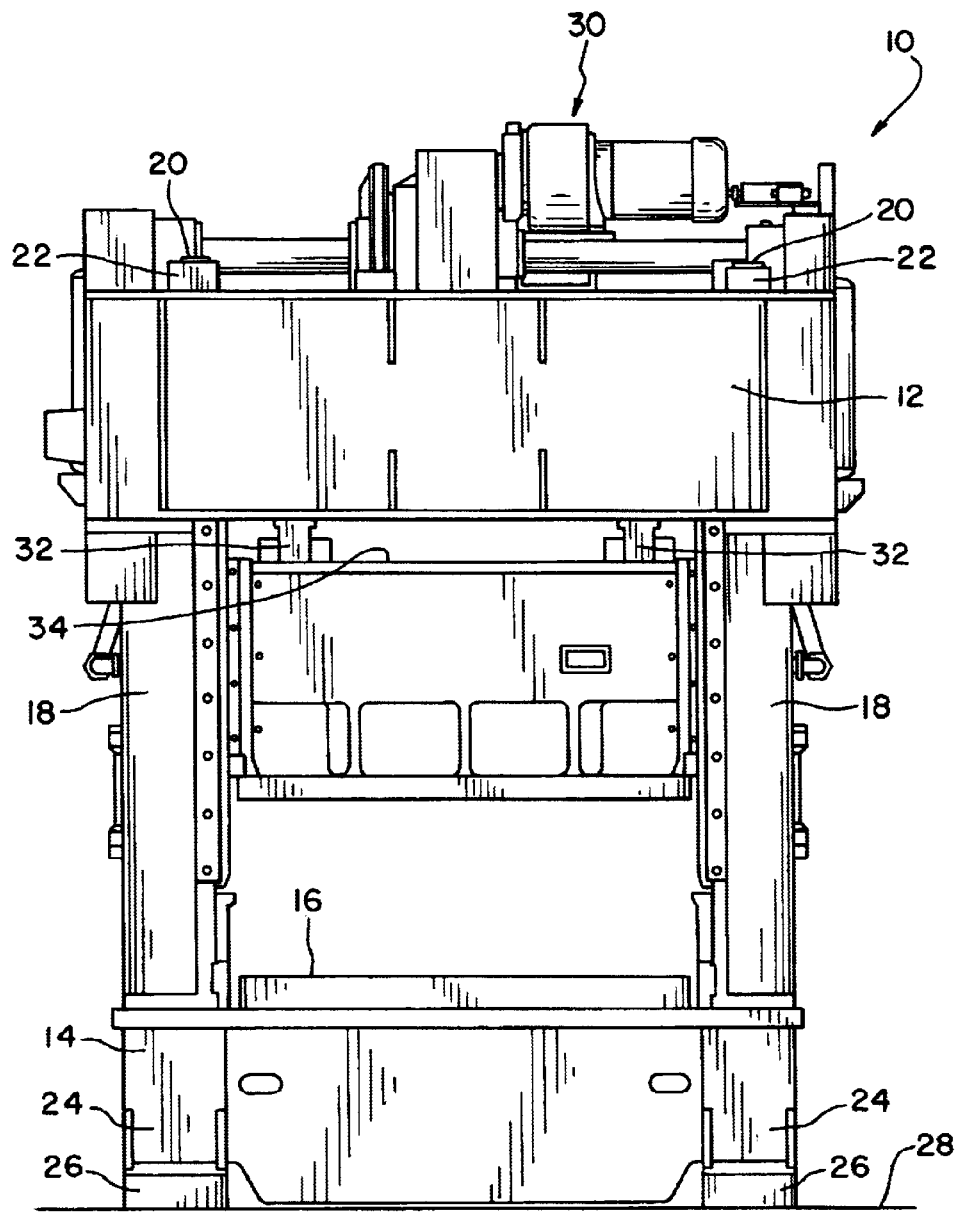
FIG. 1 is a front elevational view of a mechanical press incorporating the sealing arrangement of the present invention.

Referring now to the drawings and particularly to FIG. 1, mechanical press 10 comprises a crown assembly 12, a bed 14 having a bolster assembly 16 connected thereto and uprights 18 connecting crown assembly 12 with bed 14. Uprights 18 are connected to or integral with the underside of crown assembly 12 and the upper side of the bed 14. Tie rods 20 extend through crown assembly 12, uprights 18 and bed 14 and are attached on each end with tie rod nuts 22. Leg members 24 are formed as an extension of bed 14 and are generally mounted on the shop floor 28 by means of shock absorbing pads 26.

Drive mechanism 30 is attached to crown assembly 12 of mechanical press 10 and connected by a clutch/brake mechanism (not shown) to a standard crankshaft (not shown) to which connecting rods 32 are attached. A slide 34 is operatively connected to connecting rods 32. During operation, drive mechanism 30 rotates the crankshaft (not shown) which operates the eccentrically connected connecting rods 32 to cause slide 34 to reciprocate in a rectilinear fashion toward and away from bed 14.

Figure 2:
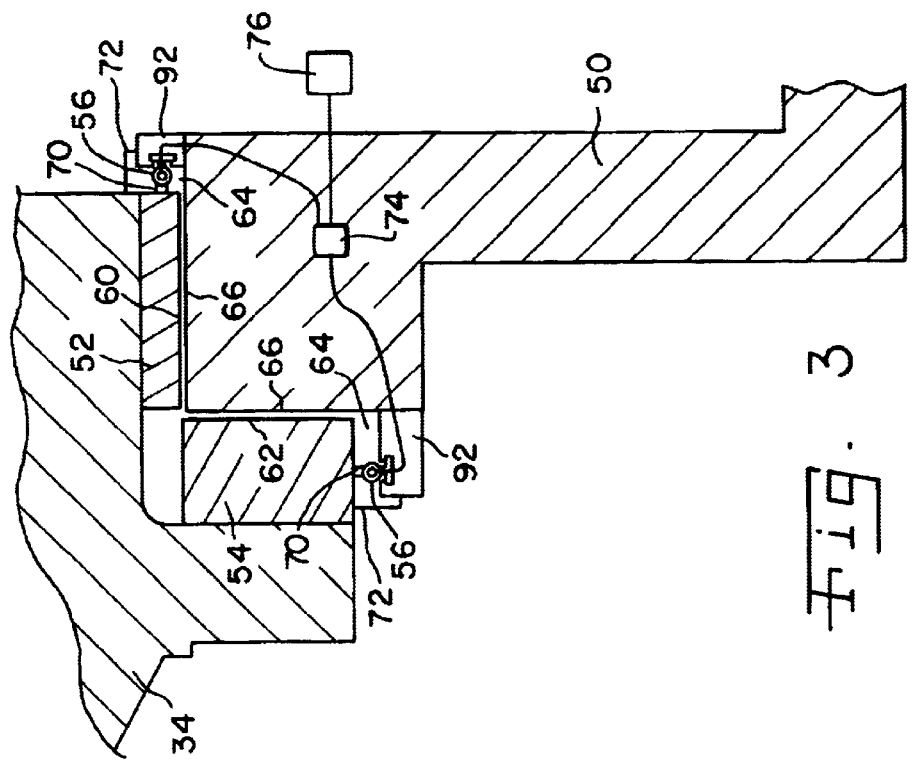
FIG. 2 is a top sectional view of the slide and the gib of a mechanical press including an embodiment of the sealing arrangement of the current invention.

FIG. 2 illustrates an embodiment of the seal mechanism of the current invention. Specifically, FIG. 2 illustrates an embodiment of the sealing arrangement utilized at a corner of slide 34. A seal mechanism in accordance with the current invention could be utilized at each corner of slide 34. As slide 34 reciprocates during press operation, the sealing arrangement of the current invention works to prevent lubrication from exiting-the area between slide 34 and gib 50.

Slide 34 includes front-to-rear touch surface 88 and right-to-left touch surface 90. Front-to-rear wear plate 52 is connected to slide 34 at front-to-rear touch surface 88. Right-to-left wear plate 54 is connected to right-to-left touch surface 90 of slide 34. Front-to-rear wear plate 52 includes front-to-rear wear plate contact surface 60. Right-to-left wear plate 54 includes right-to-left wear plate contact surface 62.

Gib 50 includes gib contact surfaces 66 which are opposite and substantially parallel to front-to-rear wear plate contact surface 60 and right-to-left wear plate contact surface 62. Seal contact blocks 86 are connected to slide 34 and have a surface finish that is approximately within the range of 16 to 32 microfinish.

Linear inflatable seals 56 are connected to gib 50 and include wear material 70 positioned on the sealing surface of linear inflatable seals 56. Inflator 74 is operatively connected to linear inflatable seals 56. Controller 76 is communicatively connected to inflator 74.

During press operation, controller 76 will signal inflator 74 to inflate linear inflatable seals 56 when necessary. Upon actuation, linear inflatable seals 56 will contact seal contact blocks 86 and form a sealed cavity 64. Collection tray 72 is operatively located beneath sealed cavity 64. In some embodiments, the cavity may remain open at particular locations to control captured oil flow.

Controller 76 may be manually operated or may receive signals corresponding to the operational state of the press from sensors (not shown) and automatically signal inflator 74 to actuate linear inflatable seals 56 when a particular press operational value exceeds a predetermined measure. Such sensed values can include values corresponding to press tipping moment, applied load, press speed, or sensed oil leaks.

Figure 3:
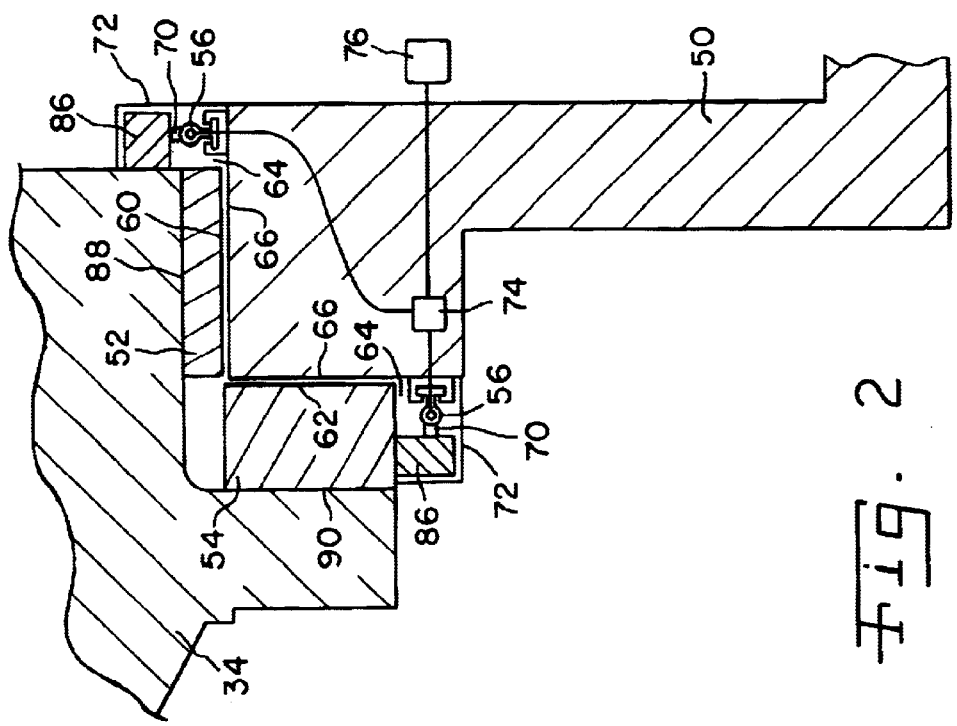
FIG. 3 is a top sectional view of the slide and the gib of a mechanical press including an embodiment-of the sealing arrangement of the current invention.

FIG. 3 illustrates another embodiment of the sealing arrangement taught by the current invention. In this embodiment, linear inflatable seals 56 are connected to gib 50 through seal mounting blocks 92. In this embodiment, linear inflatable seals 56 have a sealing surface which contains wear material 70. Upon inflation of linear inflatable seals 56, wear material 70 contacts front-to-rear wear plate 52 and right-to-left wear plate 54 and forms sealed cavity 64.

FIG. 4 illustrates another embodiment of the sealing arrangement of the current invention. In this embodiment, front-to-rear wear plate 52 and right-to-left wear plate 54 are connected to gib 50. Slide 34 includes slide contact surfaces 68 which are opposite and substantially parallel to front-to-rear wear plate contact surface 60 and right-to-left wear plate contact surface 62. Linear inflatable seals 56 are connected to gib 50 by way of seal mounting blocks 92 and selectively form sealed cavity 64.

FIG. 5 illustrates an embodiment of the current invention which utilizes linear seals 58. Linear seals 58 are formed from linear strips of steel which have sealing surfaces. Wear material 70 is connected to the sealing surfaces of linear seals 58. Gib 50 includes linear grooves 78 which house linear seals 58. Linear grooves 78 include bearings 82 and pressure chambers 84. Inflator 74 is operatively connected to pressure chambers 84 and is communicatively connected to controller 76.

Slide 34 includes front-to-rear touch surface 88 and right-to-left touch surface 90. Front-to-rear wear plate 52 and right-to-left wear plate 54 are connected to front-to-rear touch surface 88 and right-to-left touch surface 90, respectively.

Gib 50 includes gib contact surfaces 66 which are opposite and substantially parallel to front-to-rear wear plate contact surface 60 and right-to-left wear plate contact surface 62. Upon actuation, linear seals 58 form sealed cavity 64. Collection tray 72 is operatively located to receive lubrication exiting sealed cavity 64.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A press, comprising:
   a frame;
   a slide mounted within the frame for reciprocation relative thereto;
   a gib connected to the frame; and
   a plurality of inflatable linear seals, said plurality of inflatable linear seals located between said gib and said slide, said plurality of inflatable linear seals selectively inflatably interacting with said gib and said slide to thereby form a cavity bounded by said gib, said slide, and said plurality of inflatable linear seals.

2. The press as recited in claim 1, wherein said plurality of linear seals are lengthwise substantially parallel to the direction in which said slide reciprocates.

3. The press as recited in claim 1, further comprising:
   a plurality of wear plates having wear plate contact surfaces, said wear plates connected to said slide, said wear plates located within said cavity; and
   said gib having a plurality of gib contact surfaces opposite and substantially parallel to said wear plate contact surfaces.

4. The press as recited in claim 1, further comprising:
   a plurality of wear plates having wear plate contact surfaces, said wear plates connected to said gib said wear plates located within said cavity; and
   said slide having a plurality of slide contact surfaces opposite and substantially parallel to said wear plate contact surfaces.

5. The press as recited in claim 2, further comprising:
   a plurality of linear strips of wear material affixed to said plurality of linear seals, said plurality of linear strips selectively contacting said slide.

6. The press as recited in claim 1, further comprising:
   a collection means for collecting lubricant from said cavity.

7. The press as recited in claim 6, wherein said collection means comprises:
   a collection tray.

8. The press as recited in claim 3, wherein said contact surfaces of said wear plates have a surface finish that is approximately within the range of 16 to 32 microfinish.

9. The press as recited in claim 1, further comprising:
   an inflator for selectively inflating said linear seals.

10. The press as recited in claim 1, wherein at least one said inflatable linear seal includes a linear strip of a wear material.

11. The press as recited in claim 2, wherein said gib has a plurality of linear grooves and said plurality of linear seals occupy said grooves.

12. The press as recited in claim 11, wherein said plurality of linear seals comprise:
   a plurality of linear strips of steel having sealing surfaces; and
   a plurality of linear strips of wear material affixed to said plurality of sealing surfaces.

13. The press as recited in claim 12, wherein said linear grooves include pressure chambers which selectively apply a pressure to said linear seals causing said linear seals to contact said slide.

14. A press, comprising:
   a frame;
   a slide mounted within the frame for reciprocation relative thereto;
   a gib connected to the frame;
   a plurality of inflatable linear seals, said plurality of inflatable linear seals located between said gib and said slide, said plurality of inflatable linear seals selectively inflatably interacting with said gib and said slide to thereby form a cavity bounded by said gib, said slide, and said plurality of inflatable linear seals;
   an inflator for selectively inflating said linear seals to thereby selectively form said cavity bounded by said gib, said slide, and said plurality of inflatable linear seals; and
   a controller for receiving a plurality of values corresponding to press operational condition and for actuating said inflator when one of said plurality of values exceeds a predetermined measure.

15. The press as recited in claim 14, wherein one of said plurality of values is a measure of press tipping moment.

16. The press as recited in claim 14, wherein one of said plurality of values is a measure of applied load.

17. The press as recited in claim 14, wherein one of said plurality of values is a measure of press speed.

18. The press as recited in claim 14, wherein one of said plurality of values is a measure of sensed oil leaks.

19. A press, comprising:
   a frame;
   a slide located within the frame for reciprocation relative thereto;
   a gib connected to the frame; and
   an inflatable linear seal, said inflatable linear seal mounted proximate said slide and configured for selectively inflatably forming a seal between said slide and said gib.

20. The press as recited in claim 19, wherein said inflatable linear seal includes a linear strip of a wear material.

21. A press, comprising:
   a bed;
   a pair of uprights connected to said bed;
   a crown connected to said uprights;
   a slide located within said uprights for reciprocation relative thereto;
   a gib attached to the press; and
   a selectively inflatable seal connected to the press, said selectively inflatable seal being configured for selectively inflatably forming a seal between said slide and said gib.

22. The press as recited in claim 21, wherein said inflatable seal is disposed between said slide and said uprights.

23. The press as recited in claim 21, wherein said inflatable seal is disposed between said slide and said gib.

24. The press as recited in claim 21, further comprising:
   an inflator for selectively inflating said seal.

25. The press as recited in claim 22, wherein said inflatable seal surrounds said slide.

26. A press, comprising:
   a bed;
   a pair of uprights connected to said bed;
   a crown connected to said uprights;
   a slide located within said uprights for reciprocation relative thereto;
   a gib attached to the press;
   a selectively inflatable seal connected to the press;
   an inflator for selectively inflating said seal; and
   a controller for receiving a plurality of values corresponding to press operational condition and for actuating said inflator when one of said plurality of values exceeds a predetermined measure.

27. A press, comprising:
   a frame;
   a slide mounted within said frame for reciprocation relative thereto, said slide having four corners, each of said corners having a front-to-rear touch surface and a right-to-left touch surface;
   a plurality of wear plates having wear plate contact surfaces, one of said plurality of wear plates affixed to each of said touch surfaces of said slide;
   a plurality of seal contact blocks, one of said plurality of seal contact blocks extending outwardly from each of said wear plates;
   a gib affixed to said frame, said gib having a plurality of gib contact surfaces opposite and substantially parallel to said wear plate contact surfaces;
   a plurality of inflatable linear seals connected to said gib, one of said plurality of linear seals selectively contacting each of said seal contact blocks and forming four vertically sealed cavities, each of said vertically sealed cavities vertically enclosing said front-to-rear touch surface and said right-to-left touch surface at each corner of said slide;
   a plurality of linear strips of wear material, one of said plurality of linear strips of wear material affixed to each of said plurality of linear seals, said plurality of linear strips selectively contacting said slide; and
   a collection tray for collecting lubricant from each of said plurality of sealed cavities.

* * * * *